United States Patent [19]

Paice

[11] Patent Number: 4,698,739
[45] Date of Patent: Oct. 6, 1987

[54] 12-PULSE MOTOR DRIVE

[75] Inventor: Derek A. Paice, Palm Harbor, Fla.

[73] Assignee: Westinghouse Electric Corp., Pittsburgh, Pa.

[21] Appl. No.: 928,145

[22] Filed: Nov. 7, 1986

[51] Int. Cl.⁴ .............................................. H02M 7/00
[52] U.S. Cl. ........................................ 363/71; 363/64
[58] Field of Search ............. 363/64, 71, 72, 135–137; 323/215, 217

[56] References Cited

U.S. PATENT DOCUMENTS

| 3,792,286 | 2/1974 | Meier | 363/71 X |
| 3,932,799 | 1/1976 | Frank et al. | 363/71 |
| 4,268,900 | 5/1981 | Hirata | 363/71 |

Primary Examiner—Peter S. Wong
Attorney, Agent, or Firm—C. M. Lorin

[57] ABSTRACT

The present invention relates to an AC motor drive including two sets of inverters, wherein one transformer is converted on the output of one of the two inverters, the output of the transformer being connected in series with the output of the other inverter.

6 Claims, 6 Drawing Figures

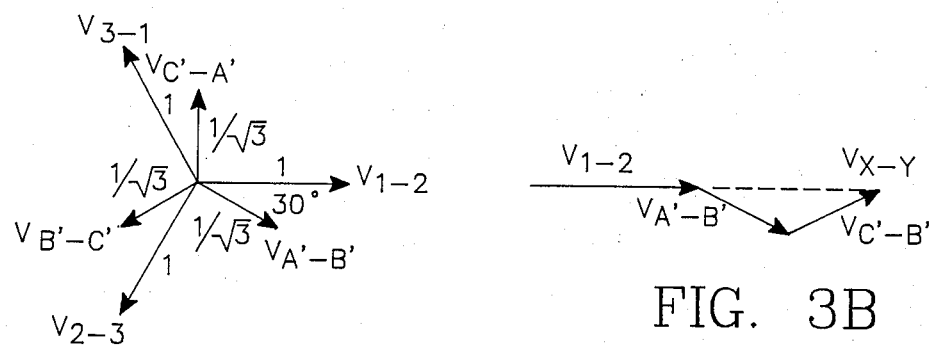
FIG. 3A
FIG. 3B
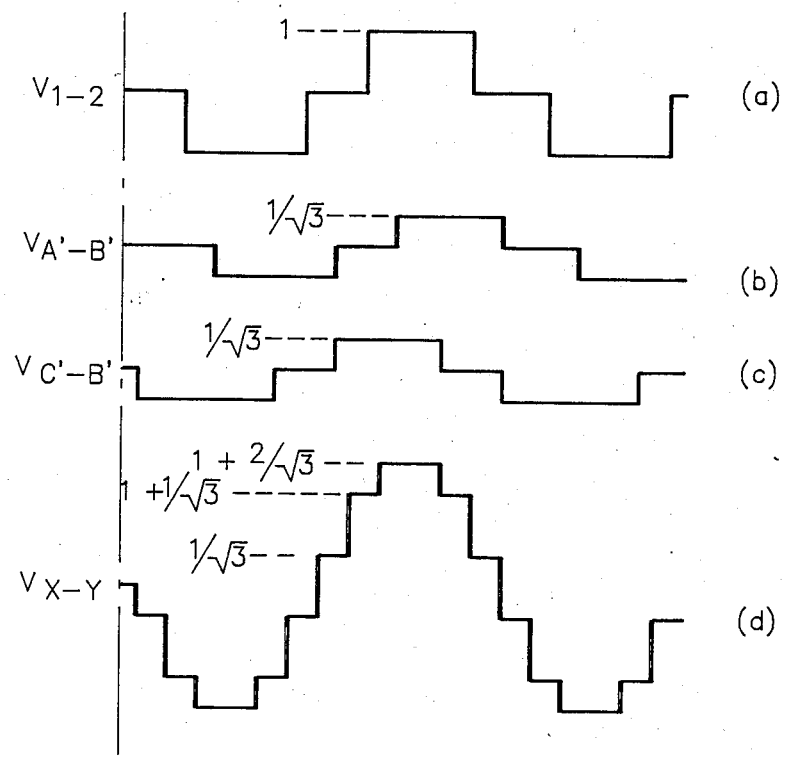
FIG. 3C

12-PULSE MOTOR DRIVE

BACKGROUND OF THE INVENTION

1. Field of the Invention

The invention relates to AC motor drives, in general, and more particularly to a voltage-source inverter-controlled AC motor drive.

2. Description of the Prior Art

When matching the ratings of the inverter with the rating of the motor, there is a need to meet the needs of a higher pulse number, a large horse power output, or a higher voltage system, as well as for providing harmonic cancellation. In so doing, manufacturing design and cost requirements strongly advocate the use of units of standard characteristics which are themselves grouping and accommodating standard parts and components. In this regard, it has been proposed to assemble in series a plurality of single phase inverters in order to put together a high voltage inverter system. See pending patent application Ser. No. 871,047, filed on June 6, 1986, W.E. 52,598 for "High Voltage Modular Inverter".

One of the problems in assembling inverters in series is to restrict the number of transformers in order to limit additional cost and losses.

The present invention calls for a 12-pulse scheme, namely a combination of two six-pulse systems having their outputs at 30° to one another. The state of the art is illustrated by U.S. Pat. No. 3,750,004 of Loren H. Walker; U.S. Pat. No. 4,063,143 of W. Forstbauer; and by the article "Double Three-Phase Wound Synchronous Machine With Twelve-Pulse Rectifier Load" by Matsumoto and Inami in Electrical Engineering in Japan, Vol. 100, No. 3, 1980, pp. 249–256. The Forstbauer patent shows two transformers arranged in series in a costly and cumbersome approach when combining the two inverters upon a single output. The Matsumoto article relates to a synchronous machine as the load, with two stators at 30° forming the outputs, a limitation for broader applications.

The Walker patent shows a twelve-pulse inverter drive system in which each inverter output has a primary winding, the primaries being coupled to two secondary winding, thereby to add the output voltages. By so doing, the Walker patent in fact makes use of two transformers added to the respective inverters.

SUMMARY OF THE INVENTION

The invention resides in a 12-pulse system combining two three phase inverters operating under a common DC link voltage and controlled at 30° to one another in a twelve-pulse fashion. It consists in placing the inverter outputs in series while inserting one isolation transformer between one inverter output and the three poles of the related inverter, the output of the transformer being placed in series with the output of the other inverter. With such an arrangement, the overall output will require only one transformer of half-rating capacity, compared with the rating of the overall pair of inverters.

BRIEF DESCRIPTION OF THE DRAWINGS

FIGS. 3A, 3B and 3C show with vectors and curves how the outputs of the two inverter sets of the system of FIG. 2 are combined to provide the desired system output voltage;

DETAILED DESCRIPTION OF THE INVENTION

Figure 1:
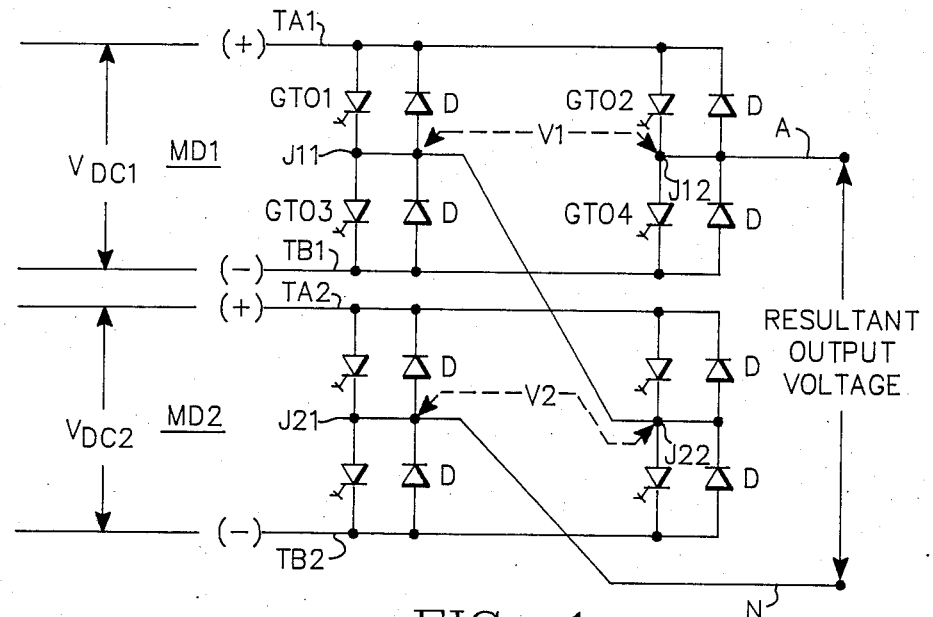
FIG. 1 shows in block diagram an inverter system of the prior art combining two inverter sets with the output thereof connected in series.

Referring to FIG. 1, two inverter modules MD1 and MD2, as disclosed in copending application Ser. No. 871,047, filed June 6, 1986, are shown with their output voltages $V_1$, $V_2$ connected in series. Voltages $V_1$, $V_2$ are connected to the outside, one with the neutral line N, for $V_2$, the other with the phase line A, for $V_1$. The junction points are J11 in inverter MD1, and J22 in inverter MD2. Module MD1 includes four GTO devices connected in pairs (GTO1, GTO3), (GTO2, GTO4), between DC link terminals TA1, TB1. The same exists in module MD2, between DC link terminals TA2, TB2 and with junction points J21, J22.

The GTO devices are associated with diodes D mounted in antiparallel fashion in each pair. The DC link voltages of the voltage sources are VDC1 and VDC2 for the respective modules MD1, MD2.

Voltages $V_1$, $V_2$ outputted by the respective inverters are square waves according to the duty-cycle of the control circuits of the GTO devices for the respective modules. Thus, the frequency is selected. Alternatively TA1, or TB1, are connected to J11, and alternatively TA2, or TB2 are connected to J21. Similarly, (TA1, or TB1) and (TA2, or TB2) are alternatively connected to J11 and J22 which are connected together. Therefore, the resultant voltages $V_1$ and $V_2$ can reach either $+(VDC1+VDC2)$ or $-(VDC1+VDC2)$. This is general knowledge.

It is assumed that control of modules MD1 and MD2 is effected with a certain phase shift so that the resultant voltage $(V_1+V_2)$ is a quasi-square curve. This also is general knowledge.

Although no transformer has been shown in FIG. 1, it is understood in the prir art that two DC-link related inverters, in order to be assembled in series, require transformers combining the separate units for operation on a common AC/DC converter input and on a common AC output load, in order to provide isolation. This is illustrated, on the output side, by the inverter arrangements of aforementioned U.S. Pat. Nos. 4,063,143 and 3,750,004. In both instances, the two inverters are each controlled with 120° phase shift between their phases, but with their respective outputs vectorially shifted at 30°. Moreover, the poles of each inverter are associated with respective primary windings of transformers, the secondary of one transformer being combined with the secondary of the other transformer so as to generate on three output terminals the vectorial component of two voltages vectors at 30° phase shift to one another. For the purpose of this description, U.S. Pat. Nos. 4,063,143 and 3,750,004 are hereby incorporated by reference.

Figure 2:
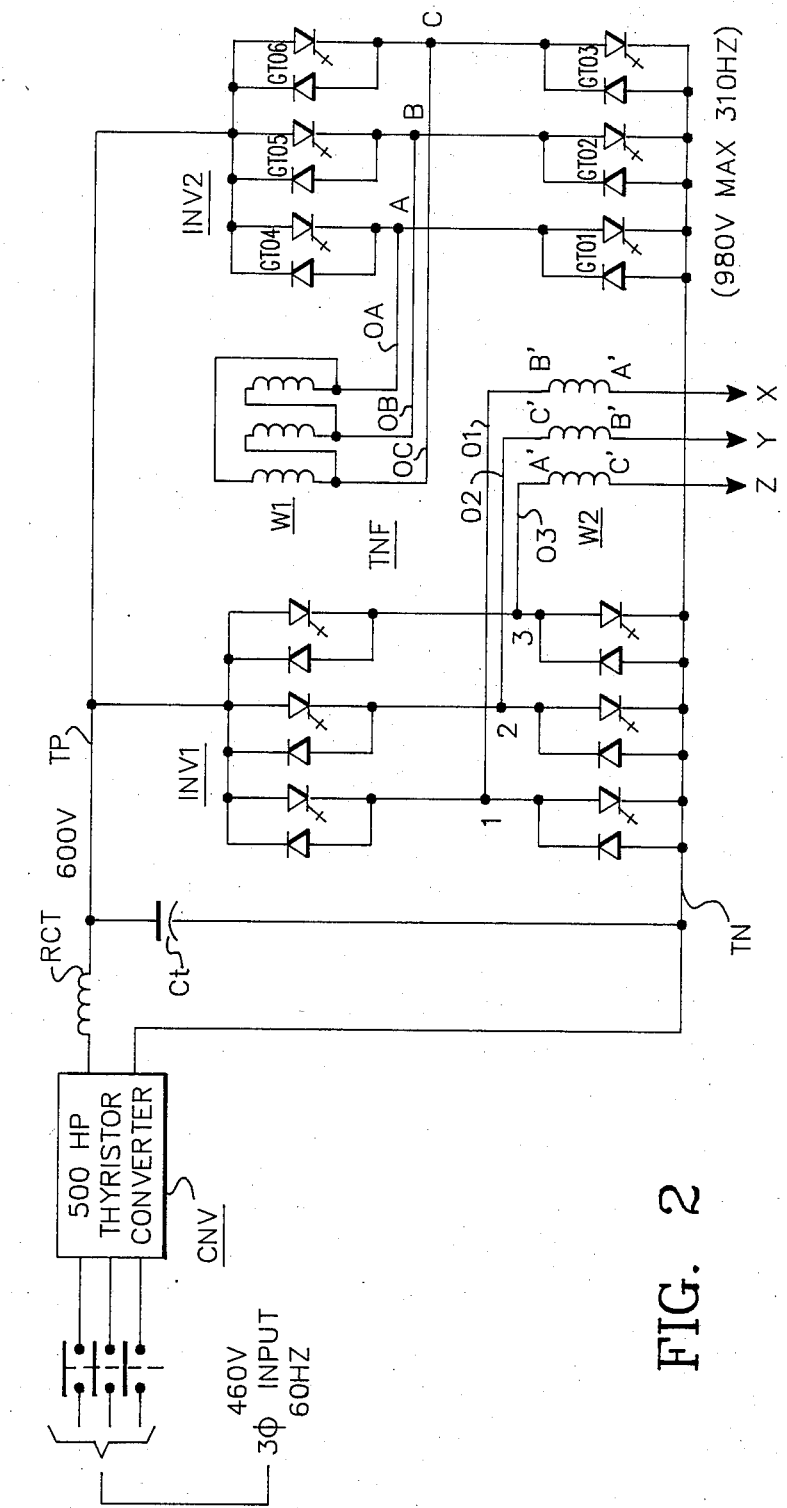
FIG. 2 illustrates in block diagram the 12-pulse inverter system according to the invention.

Referring to FIG. 2, the 12-pulse inverter system according to the invention is shown to include two three-pole inverters INV1, INV2, each illustrated with six GTO devices used for the respective poles by pairs about junction points 1, 2, 3 for inverter INV1, A, B, C for inverter INV2. A common DC link having terminals TP and TN includes a parallel capacitor Ct and a series reactor RCT. The AC power supply (typically with 460 volts, 60 Hz and 3 phases) is rectified by a thyristor converter (typically, 500 horsepower) to generate the DC voltage (typically, 600 volts) between TA and TB. The GTO's have, typically, a 1200 V rating with a 1200 A peak switching rating when the inverters are being controlled for a variable frequency output.

Having so defined the ratings of the two sets of inverters INV1, INV2, the problem is to be able to meet the needs of a higher pulse number, or of a larger horsepower, or of higher voltage at the output. As shown in FIG. 1, and as illustrated in detail by the two aforementioned U.S. patents, this goal can be achieved by connecting an appropriate number of separate units in series (MD1, MD2 in FIG. 1) or in parallel, while providing input and/or output transformers as needed for voltage increase, as well as for isolation. However, it is desirable to restrict the number of transformers in order to limit cost and losses. Moreover, transformers become oversized when a voltage boost is needed, as the case is for constant torque loads and for low frequency at the start.

FIG. 2 shows a solution to this problem, given illustratively in a situation for which twice the voltage of the inverter input is required, and with namely 920 volts for 1200 volt GTO poles in a 12-pulse system. (The 12-pulse scheme provides a GTO peak current of about 20% less than for a six-pulse scheme, thereby allowing more horsepower per GTO where the peak current is limiting factor, while at the same time reducing the harmonic losses, as illustrated by the vectors and curves of FIGS. 3A, 3B hereinafter.) In accordance with the present invention, a 12-pulse inverter system includes a single transformer TNF for implementing the series combination of the inverter outputs. As illustrated in FIG. 2, a single three-phase transformer TNF is applied to the output of inverter INV2, having primary and secondary windings W1, W2. The primary windings W1 are connected to the three output terminals A, B, C of the inverter. The secondary windings W2 to place their output voltages in series with the respective output voltages of the other inverter INV1, so that the summed line-to-line voltages appear between the output terminals X, Y, Z of the 12-pulse inverter system. More specifically, windings W1 are delta-connected and windings W2 are star-connected. The secondary winding A'B' for terminal X is associated with the primary winding which is across pole outputs A and B and connects terminal X to junction point 1 of inverter INV1 (first pole). Similarly, B'C' is coupled to the primary winding connected across poles B and C of inverter INV2, while connecting terminal Y to junction 2 of INV1. Finally, C'A' is the secondary of the primary winding of transformer TNF mounted across poles A and C of INV1 and connects terminal Z to pole 3 of INV1. It appears in the example of FIG. 2, that a (920 volt), 1200 volt GTO pole system has been realized with a transformer TNF rated for only half of the kVA output. Two 250 HP three-phase inverters have their outputs in series to provide a 12-pulse waveform, one inverter having associated therewith an output transformer rated at about 22 kVA to provide isolation. The resulting output is a 12-pulse output waveshape, as shown in FIGS. 3A, 3B, providing a 920 volt output at nominal 460 volt input.

Referring to FIG. 3A, vectors $V_{1-2}$, $V_{2-3}$ and $V_{3-1}$ at the output of inverter INV1 are shown in per-unit value as 1. They are the line-to-line voltages. With the same vectors in magnitude between output terminals A, B, C of inverter INV2, and a 30° phase shift in control between the two inverters, transformer TNF generates a set of vectors $V_{A'-B'}$, $V_{B'-C'}$ and $V_{C'-A'}$ of amplitude $1/\sqrt{3}$ and shifted by 30° in relation to the ($V_{1-2}$, $V_{2-3}$, $V_{3-1}$) set of vectors. The resulting line-to-line vectors $V_{XY}$, $V_{YZ}$ and $V_{ZX}$ are double in size the ($V_{1-2}$, $V_{2-3}$, $V_{3-1}$) vector magnitude. Vector $V_{1-2}$ combines vectorially with $V_{A'-B'}$ and $V_{C-B'}$ as shown in FIG. 3B for illustration, $V_{A'-B'}$ and $V_{C-B'}$ being each at −30° and +30°, respectively, in relation to $V_{1-2}$. Therefore, $V_{X-Y} = 1 + 2(1/\sqrt{3} \times \cos 30°)$. Curves (a) through (d) show in FIG. 3C how $V_{12}$, $V_{A'-B}$ $V_{C-B'}$ are combining as a function of time to give $V_{X-Y}$, considering that:

$V_{1-2}$ is given by;

$$2\sqrt{3}/\pi[\cos \omega t - \cos 5\omega t/5 + \cos 7\omega t/7 - \cos 11\omega t/11 + \ldots]$$

whereas:

$$V_{A'-B'} = V_{1-2}/\sqrt{3} < -\pi/6 \text{ and}$$
$$V_{C-B'} = V_{1-2}/\sqrt{3} < +\pi/6$$

The result being:

$$V_{X-Y} = 4\sqrt{3}/\pi[\cos \omega t - \cos 11\omega t/11 + \cos 13\omega t/13 - \cos 23\omega t/23 + \cos 25\omega t/25 - \ldots]$$

With the arrangement of FIG. 2, it is also observed that cost reduction with the transformer combines with cost reduction in the GTO's and that balancing reactors are not required to ensure an even distribution of power between the two inverters. The output voltage can be further raised, if the existing high speed motor so requires, by using either input, or output autotransformers. By so doing, it is possible to raise the DC link voltage so as to increase the inverter power, while remaining compatible with the GTO ratings.

It is understood that the DC to AC inverter heretofore described can be applied with advantage in other where 12-pulse inverter output waveforms are desired, such as in static VAR generators. As another application of the invention, additional Volts/Hertz at reduced voltage output, such as may be required for increased motor starting torque, can be obtained by gating the switches of inverter INV2 so as to make the transformer output equal to zero voltage, while providing a path for output current. This is derived, by gating GTO1, GTO2, and GTO3 but not gating GTO4, GTO5, and GTO6.) In this manner inverter INV1 provides increased Volts/Hz of a 6-pulse nature up to half the output voltage, without requiring additional volt-/second capability in the transformer design.

It is also understood that the two three-pulse inverters according to the invention can be powered from any two equal amplitude DC sources, including two series-connected and equal DC sources.

Figure 4:
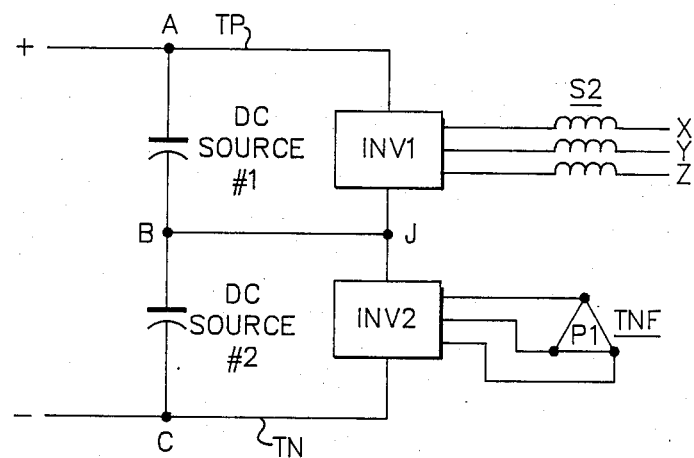
FIG. 4 shows an alternative embodiment of the invention.

Two DC sources #1 and #2 are shown in FIG. 4 associated with the respective inverters INV1 and INV2, there being a common junction BJ between the nodal points of the respective pairs. Besides, as earlier stated, the single transformer TNF has its primary P1 connected at the output of inverter INV2 and its secondary S2 inserted in series in the phase lines X, Y, Z of inverter INV1.

It is understood that, instead of a transformer of the delta-star type as shown in FIG. 2, other types of transformers can be used, for instance a transformer of the zig-zag winding type, as generally known.

I claim:

1. In a 12-pulse inverter system including a voltage source, a DC link and at least a first inverter set and second inverter set providing respective first and second three-phase outputs, the combination of:
   a three-phase transformer having a primary and a secondary, said primary being connected to one of said first and second outputs for generating at said secondary a third three-phase output;
   with said third three-phase output being connected in series with the other of said first and second outputs to form the output of said 12-pulse inverter system;
   said three-phase transformer being rated at half the power of said third three-phase output.

2. The system of claim 1 with said first and second inverter sets having the same balanced three-phase output voltages in magnitude and being controlled at 30° phase shift, whereby said transformer generates, in response to the associated inverter set output, said third three-phase output at 30° to the three-phase output of the other inverter set, the 12-pulse inverter system having an output which is twice in magnitude the magnitude of said inverter sets output voltages.

3. The system of claim 2 with the primary of said transformer being delta-connected, and the secondary thereof being star-connected.

4. The system of claim 2 with the primary of said transformer being star-connected, and the secondary thereof being delta-connected.

5. The system of claim 2 with the primary and secondary of said transformer being zig-zag connected for providing 30° phase shift therebetween.

6. The system of claim 3, with said first inverter being gated to provide zero voltage on said first three-phase output, whereby said third three-phase output operates under said second inverter and second three-phase output at less than half voltage; and with additional volts/Hz being applied to said third three-phase output, whereby to operate th system without additional volts-seconds in said transformer.

* * * * *